United States Patent
Jensen et al.

(10) Patent No.: US 6,674,641 B2
(45) Date of Patent: Jan. 6, 2004

(54) LATCH FOR COMPUTER CHASSIS FAN ASSEMBLY

(75) Inventors: Ralph Warren Jensen, Austin, TX (US); Bruce McLellan, Round Rock, TX (US); Robert Boyd Curtis, College Station, TX (US)

(73) Assignee: Dell Products L.P., Round Rock, TX (US)

( * ) Notice: Subject to any disclaimer, the term of this patent is extended or adjusted under 35 U.S.C. 154(b) by 75 days.

(21) Appl. No.: 09/906,629

(22) Filed: Jul. 16, 2001

(65) Prior Publication Data

US 2003/0011985 A1 Jan. 16, 2003

(51) Int. Cl.$^7$ .................................................. G06F 1/20
(52) U.S. Cl. ...................... 361/687; 361/683; 361/704; 361/695; 292/175; 248/27.1; 165/80.3; 211/41.17
(58) Field of Search ................................. 361/687, 683, 361/724–727, 695, 704; 211/41.17; 454/184; 165/80.3, 121–126; 415/213.1, 214.1; 248/27.1, 27.3; 292/175, 152, 153, 147, 87, 89, DIG. 61

(56) References Cited

U.S. PATENT DOCUMENTS

| | | | | |
|---|---|---|---|---|
| 86,242 A | * | 1/1869 | Newcomb ................... | 292/175 |
| 5,217,190 A | * | 6/1993 | Reed et al. ................. | 248/27.3 |
| 5,359,492 A | * | 10/1994 | Porter ......................... | 361/683 |
| 5,505,521 A | | 4/1996 | Meiller et al. | |
| 5,711,554 A | * | 1/1998 | Brown et al. ................. | 292/87 |
| 5,927,389 A | * | 7/1999 | Gonsalves et al. ........... | 361/687 |
| 5,963,422 A | * | 10/1999 | Golobay et al. ............. | 361/686 |
| 6,059,481 A | | 5/2000 | Genequand | |
| 6,215,659 B1 | * | 4/2001 | Chen ........................... | 361/695 |
| 6,220,637 B1 | * | 4/2001 | Kierl ............................ | 292/87 |
| 6,283,512 B1 | * | 9/2001 | Butterbaugh et al. ......... | 292/87 |

* cited by examiner

*Primary Examiner*—Lisa Lea-Edmonds
(74) *Attorney, Agent, or Firm*—Haynes and Boone, LLP.

(57) ABSTRACT

A computer chassis includes heat generating components and a fan housing adjacent the components. A plate is mounted in the fan housing. A first flexible member extends from the plate. A second flexible member extends from the plate and is spaced apart from the first member. A grip member interconnects a distal end of the first and second members spaced apart from the plate. A latch extends from adjacent the grip member. An anti-buckle member extends between the first and second members for maintaining the flexible members spaced apart.

23 Claims, 5 Drawing Sheets

LATCH FOR COMPUTER CHASSIS FAN ASSEMBLY

BACKGROUND

The disclosures herein relate generally to computer systems and more particularly to securing fans used to cool such systems.

In some computer chassis there is a need for snap-locking feature for the rear fan assembly. A sliding "bolt" type of lock would be a good solution, except that it would require at least one additional part as well as a relatively complex subassembly, adding cost as well as being prone to jamming. Because of the drop-shock requirement of computer chassis, a conventional cantilever latch would either buckle, and thereby unlatch during drop, or be so thick and stiff as to make it very difficult to latch or unlatch. Also a conventional snap latch would not be able to lock down the fan assembly in a preloaded condition such as a screw does.

In general, a conventional cantilever latch is limited in the amount of normal load it can withstand before rotating and camming open, and/or, buckling. Within the context of the required latch movement forces, latch travel, latch strength, and available space, there often are not enough degrees of freedom available. Overall length, width and depth of cross section, and taper are typically the only variables. Also, a cantilever latch's movement is always essentially circular, which is often not advantageous.

A common screw could provide a solution. However, a screw is deemed very undesirable as it forces the customer to use a tool to assemble/disassemble the chassis. Also, a common screw becomes a loose part, which can get lost within, and "short-out", the computer. A captive thumbscrew is often used for such applications, however, they are much more costly than common screws and are not as quick and easy to use as a snapping latch. Also, there may not be enough room or material to use a captive thumbscrew.

There are a plethora of conventional cantilever type latches used in computer chassis. Snap cantilever latches are used in all sorts of devices/products, ranging from battery door covers to gate latches for chain link fences.

Therefore, what is needed is a robust lock for a fan assembly which permits quick installation and removal.

SUMMARY

One embodiment, accordingly, provides a quick release latch for a fan assembly which can withstand high force loads. To this end, a quick release latch includes a plate having a first flexible member and a second flexible member spaced apart from the first member. A grip member interconnects a distal end of the first and second members. A latch extends from adjacent the grip member.

A principal advantage of this embodiment is that the latch is flexible, robust and includes an anti-buckle capability for withstanding shock loads.

DETAILED DESCRIPTION

Figure 1:
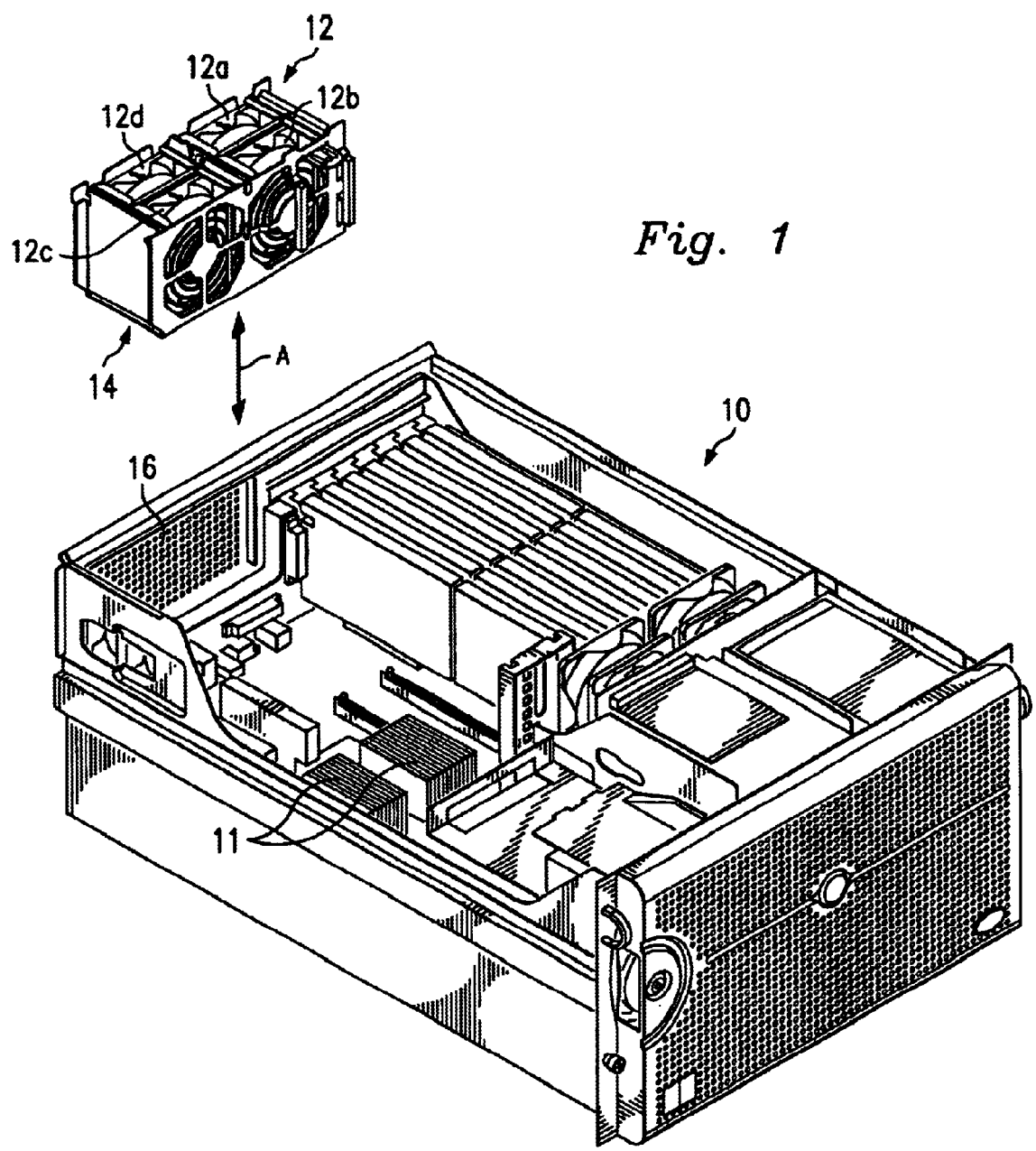
FIG. 1 is a perspective view illustrating an embodiment of a server chassis.
Figure 2:
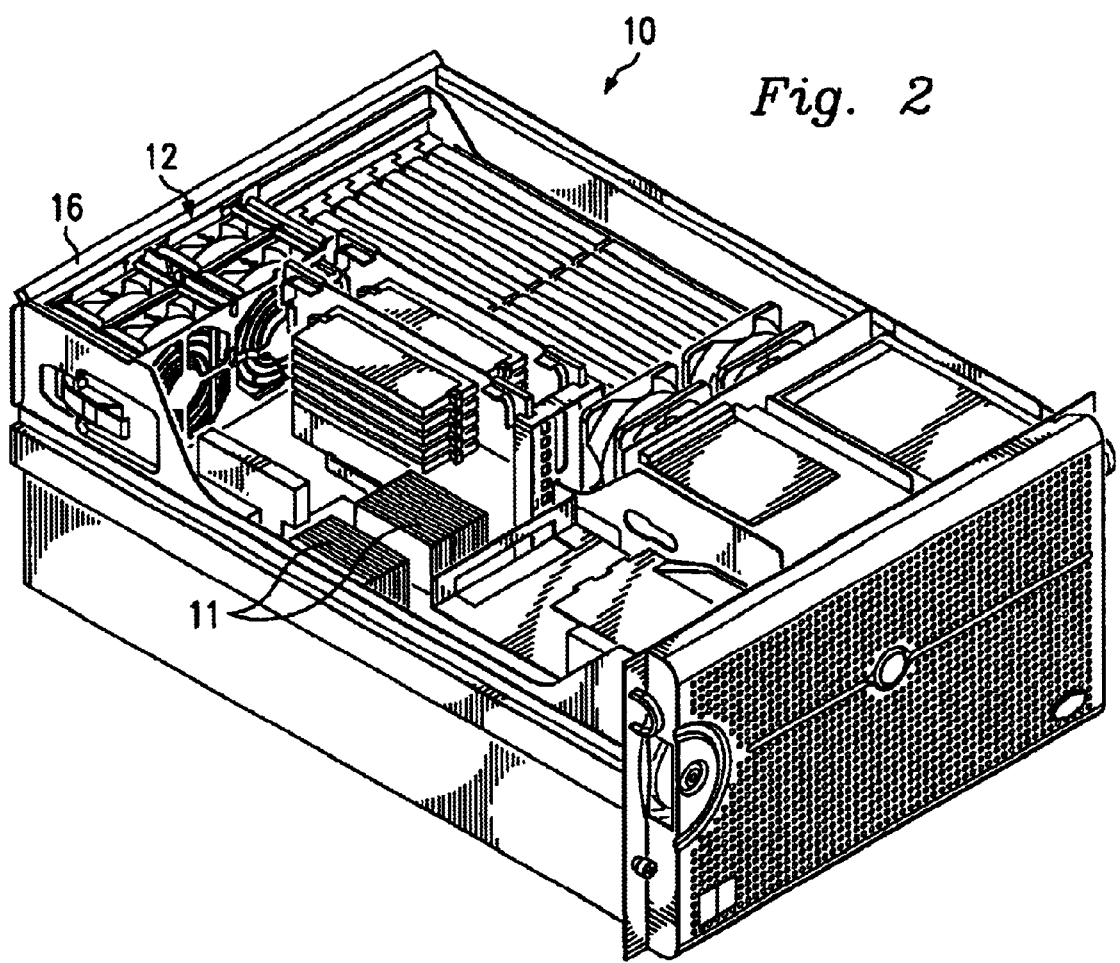
FIG. 2 is another perspective view illustrating an embodiment of a server chassis.

A server chassis is generally designated 10 in FIG. 1 and includes a fan assembly 12, also referred to as a 4-pack, which includes 4 fans 12a, 12b, 12c and 12d carried in a fan assembly housing 14 for cooling components in the chassis 10 such as, for example, heat sinks 11 used for cooling CPU's. The fan assembly 12 is installed into and the removed from the chassis 10 in the directions indicated by the bi-directional arrow designated A. When the fan assembly 12 is installed into chassis 10, the assembly 12 is positioned adjacent a well ventilated wall 16 of chassis 10, see also FIG. 2. Although chassis 10 is described as a server chassis, any electronic housing which requires fan cooling is contemplated.

Figure 3:
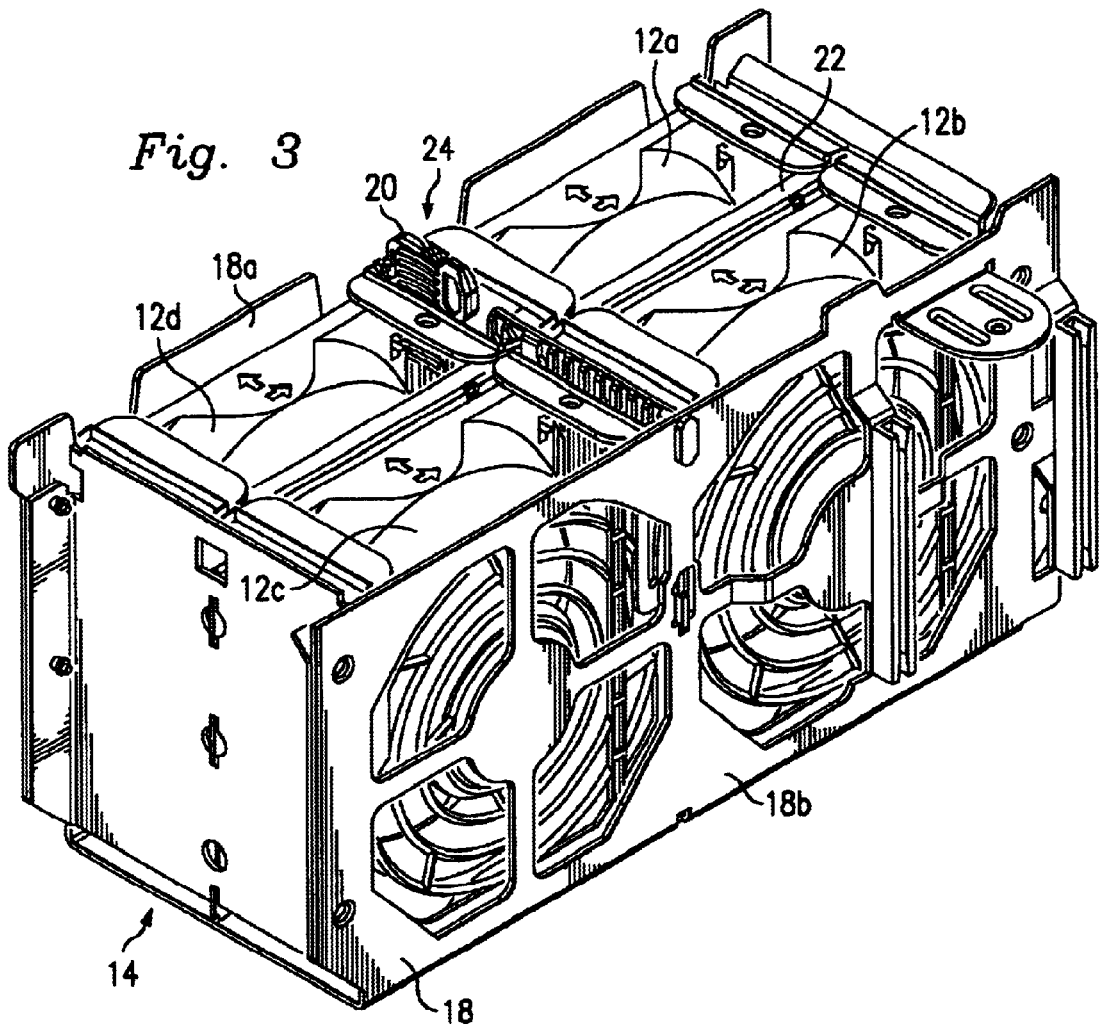
FIG. 3 is a perspective view illustrating an embodiment of a fan assembly.
Figure 4:
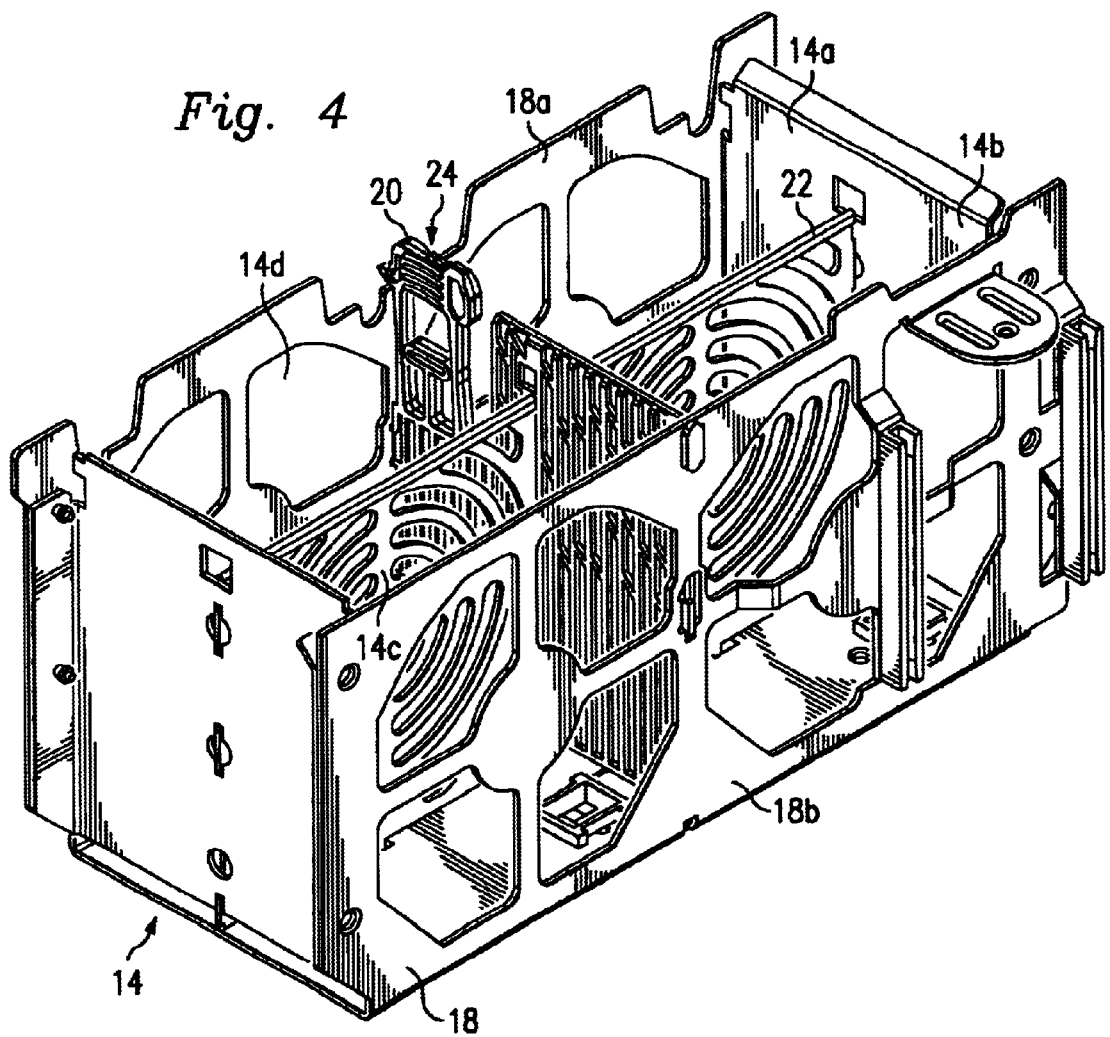
FIG. 4 is a perspective view illustrating an embodiment of a fan assembly housing.

The fan assembly housing 14, FIGS. 3 and 4, which houses the fans 12a, 12b, 12c and 12d, is divided into four fan compartments 14a, 14b, 14c and 14d, respectively. The housing 14 comprises a peripheral wall 18 and a pair of interlocked divider plates 20 and 22. Plate 20 is transverse to plate 22. Plate 20 is preferably formed of a suitable molded synthetic material such as, for example, PC-ABS. Although plate 20 is substantially flexible, it is also substantially rigid when interlocked with plate 22 and snapped into position between two opposed portions 18a, 18b of peripheral wall 18.

Plate 20 includes a built-in latch/handle combination 24 integrally formed with plate 20, which is used to manually hold housing 14 during installation and removal, and also to latch and unlatch the housing 14 in chassis 10.

Figure 5:
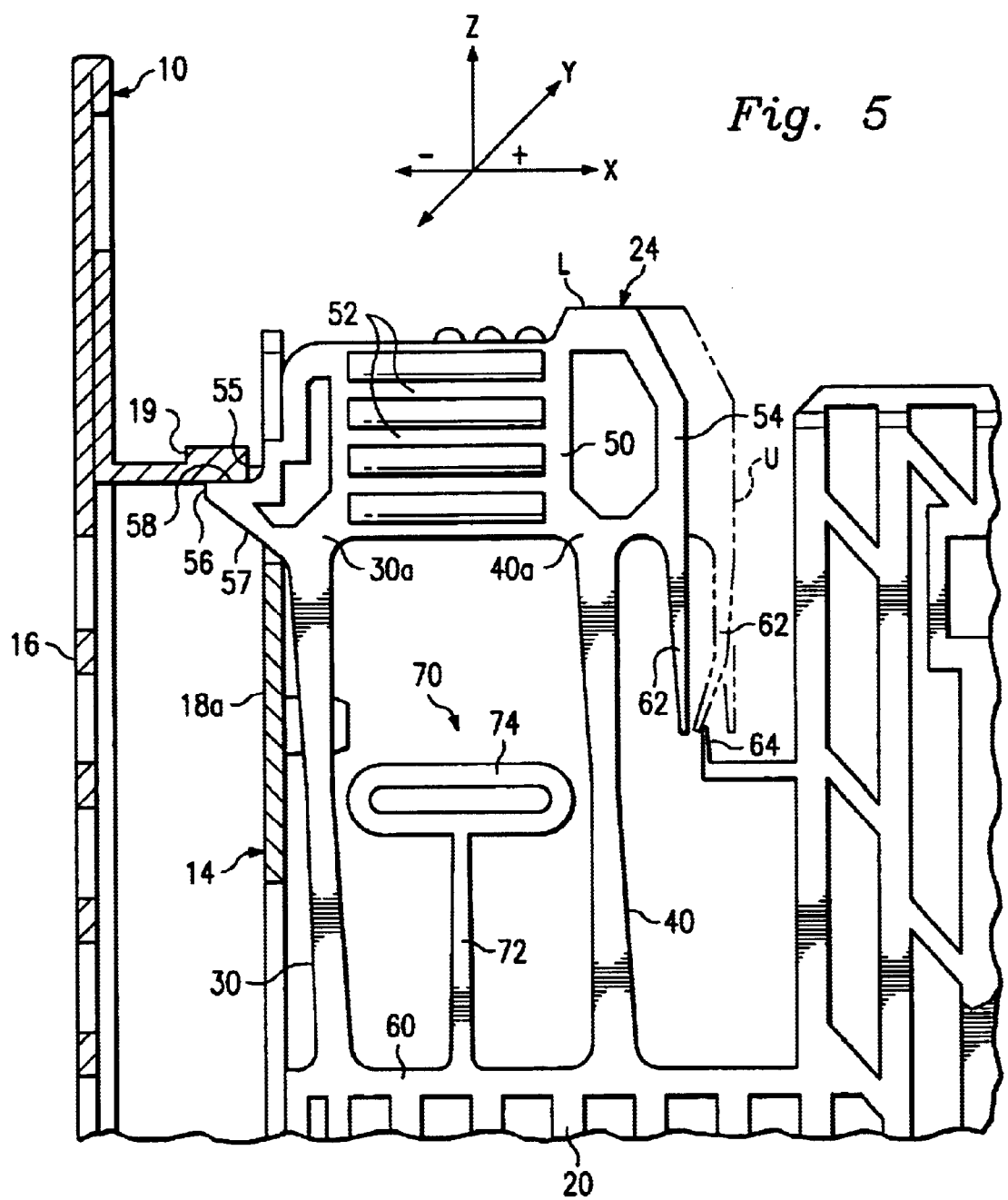
FIG. 5 is a frontal view illustrating an embodiment of a portion of the fan assembly housing.

Latch/handle 24 is further illustrated in FIG. 5, and comprises a 4-bar latch device including a first bar 30, a second bar 40, a third bar 50 and a fourth bar 60. Latch/handle 24 is illustrated in an at-rest or latched position L, wherein the first bar 30, which is a flexible member, and the second bar 40, which is also a flexible member, are inclined toward peripheral wall 18a of fan housing 14 which is adjacent wall 16 of chassis 10. The first and second bars 30, 40, respectively, extend from plate 20 and are spaced apart and substantially parallel to each other. The third bar 50 interconnects a distal end 30a of first bar 30 with a distal end 40a of second bar 40. Third bar 50 is thus spaced apart from fourth bar 60 which is essentially an edge portion of plate 20.

Third bar 50 includes a plurality of grip members 52 and an integrated handle 54. At a juncture of first bar 30, and third bar 50, a latch 56 includes a latch surface 58, a tapered surface 57 and a rounded surface 55. Wall 16 of chassis 10 includes a flange 19 for engagement with latch 56. Thus, when fan housing 14 is installed into chassis 10, tapered surface 57 engages flange 19 causing latch 56 to be urged in the +X direction so that when the fan housing 12 seats in the chassis 10, latch surface 58 snaps into a latched position L in engagement with flange 19. Therefore, for removal of housing 14, latch 24 is manually urged in the −X direction to disengage latch surface 58 from flange 19. When latch 24 is moved sufficiently in the +X direction, to an unlatch position U, a clicking barb 62 engages, flexes and snaps past a clicker arm 64 to provide an audible/tactile feedback to the user that latch 56 is clear of flange 19 to permit removal of fan housing 14 from chassis 10.

An anti-buckle member 70 extends from fourth bar 60 between first bar 30 and second bar 40. Anti-buckle member 70 is substantially T-shaped including a first member 72 extending in a first direction, essentially vertically from plate 20. A second member 74 of anti-buckle member 70 is attached to or formed with first member 72 and extends transverse to first member 72 and has terminal ends adjacent first bar 30 and second bar 40. Thus, anti-buckle member 70 limits movement of the first bar 30 and the second bar 40 toward each other in the X direction.

In operation, the detailed means of achieving these advantageous capabilities are due to a combination of features. Because the first 30 and second 40 bars are of equal length, the latching surface 58 does not rotate as it moves (latches/unlatches). This provides a feel and function of a linearly sliding device (X-direction). The rounded surface 55 on the latch 56 and sheet metal flange 19 cause the latch to dog-down or preload the 4-pack into it's resting position. A conventional latch would not provide the proper movement nor forces that would eliminate assembly clearances, due to tolerances, between the chassis 10 and the 4-pack. Assembly clearances must be substantially eliminated between the chassis 10, and especially heavy components such as the 4-pack to limit high internal collision loads, when dropped. Also, because the first 30 and second 40 bars are relatively long and thin, the latch 56 is easily moved with finger pressure (<3.5 lbf). The thinner the bars are however, the more easily they will buckle. The most common modes of buckling failure are for the first bar 30 to buckle in the Y and then X directions, under compressive loading. The Y direction buckling is prevented because of the adjacent fans in the 4-pack. The X direction buckling is prevented in the -X direction by the sheet metal wall 18a of the 4-pack and by the anti-buckling member 70 in the +X direction. The anti-buckling member 70 allows the second bar 40 to support first bar 30 when the first bar 30 starts to buckle. In addition, the third bar 50 acts as a convenient handle 24 for raising or lowering the 4-pack into and out of the chassis 10 (integrated carrying/installation handle). Finger grip features 52 help provide the handle function. Further, a tactile/acoustic feedback upon latching/unlatching, can be integrated into the 4-bar latch. When the third bar 50 moves either back or forth (X-direction) the clicking barb 62 snaps past the edge of the clicker arm 64 providing a click feedback to the user/assembler.

As a result, one embodiment provides a quick release latch comprising a plate, a first flexible member extending from the plate, a second flexible member extending from the plate and spaced apart from the first flexible member, a grip member interconnecting a distal end of the first and second flexible members spaced apart from the plate, and a latch extending from adjacent the grip member.

Another embodiment provides a computer chassis comprising a plurality of heat generating components mounted in the chassis, a fan housing adjacent the components, a plate mounted in the fan housing, a first flexible member extending from the plate, a second flexible member extending from the plate and spaced apart from the first flexible member, a grip member interconnecting a distal end of the first and second flexible members spaced apart from the plate, a latch extending from adjacent the grip member, and anti-buckle means extending between the first and second flexible members for maintaining the flexible members spaced apart.

A further embodiment provides a quick release latch comprising a plate, a first flexible member extending from the plate, a second flexible member extending from the plate and spaced apart from the first flexible member, a grip member interconnecting a distal end of the first and second flexible members spaced apart from the plate, a latch extending from adjacent the grip member, an audible/tactile feedback member extending from the plate, and an anti-buckle member extending between the first and second members.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A quick release latch comprising:
   a plate;
   a first flexible member extending from the plate;
   a second flexible member extending from the plate and spaced apart from the first flexible member;
   a grip member interconnecting a distal end of the first and second flexible members spaced apart from the plate;
   a latch extending from adjacent the grip; and
   an anti-buckle member including a member having opposed ends terminating adjacent the first and second flexible members.

2. The latch as defined in claim 1, further comprising:
   an anti-buckle member extending between the first and second flexible members.

3. The latch as defined in claim 1 wherein the grip member includes a handle.

4. The latch as defined in claim 1 wherein the first and second flexible members are substantially parallel.

5. The latch as defined in claim 1 wherein the anti-buckle member is substantially T shaped.

6. The latch as defined in claim 1 wherein the anti-buckle member includes a first member extending in a first direction from the plate and a second member extending from and transverse to the first member.

7. The latch as defined in claim 1 wherein the anti-buckle member is attached to the plate and extends in close proximity to the first and second flexible members.

8. A fan housing comprising:
   a chassis including a plurality of fan compartments;
   a plate separating the fan compartments;
   a movable grip and latch connected to the plate including:
      a first flexible member extending from the plate;
      a second flexible member extending from the plate and spaced apart from the first flexible member;
      a grip member interconnecting a distal end of the first and second flexible members spaced apart from the plate; and
      a latch member extending from adjacent the grip member in engagement with the chassis; and
   an anti-buckle member extending between the first and second flexible members.

9. The fan housing as defined in claim 8 wherein the grip member includes a handle.

10. The fan housing as defined in claim 8 where the first and second flexible members are substantially parallel.

11. The fan housing as defined in claim 8 wherein the anti-buckle member is substantially T shaped.

12. The fan housing as defined in claim 8 wherein the anti-buckle member includes a first member extending in a first direction from the plate and a second member extending from and transverse to the first member.

13. The fan housing as defined in claim 8 wherein the anti-buckle member is attached to the plate and extends in close proximity to the first and second flexible members.

14. The fan housing as defined in claim 8 wherein the anti-buckle member includes a member having opposed ends terminating adjacent the first and second flexible members.

15. A computer chassis comprising:

a plurality of heat generating components mounted in the chassis;

a fan housing adjacent the components;

a plate mounted in the fan housing;

a first flexible member extending from the plate;

a second flexible member extending from the plate and spaced apart from the first flexible member;

a grip member interconnecting a distal end of the first and second flexible members spaced apart from the plate;

a latch extending from adjacent the grip member; and anti-buckle means extending between the first and second flexible members for maintaining the flexible members spaced apart.

16. The chassis as defined in claim 15 wherein the grip member includes a handle.

17. The chassis as defined in claim 15 wherein the first and second flexible members are substantially parallel.

18. The chassis as defined in claim 15 wherein the anti-buckle member is substantially T shaped.

19. The chassis as defined in claim 15 wherein the anti-buckle member includes a first member extending in a first direction from the plate and a second member extending from and transverse to the first member.

20. The chassis as defined in claim 15 wherein the anti-buckle member is attached to the plate and extends in close proximity to the first and second flexible members.

21. The chassis as defined in claim 15 wherein the anti-buckle member includes a member having opposed ends terminating adjacent the first and second flexible members.

22. A quick release latch comprising:

a plate;

a first flexible member extending from the plate;

a second flexible member extending from the plate and spaced apart from the first flexible member;

a grip member interconnecting a distal end of the first and second flexible members spaced apart from the plate;

a latch extending from adjacent the grip member;

means for providing an audible feedback when the latch is moved; and an anti-buckle member attached to the plate and extending in close proximity to the first and second flexible members.

23. A quick release latch comprising:

a plate;

a first flexible member extending from the plate;

a second flexible member extending from the plate and spaced apart from the first flexible member;

a grip member interconnecting a distal end of the first and second flexible members spaced apart from the plate;

a latch extending from adjacent the grip member;

a tactile feedback member extending from the plate; and an anti-buckle member extending between the first and second members and having opposed ends terminating adjacent the first and second flexible members.

* * * * *